June 24, 1924.

Re. 15,865

E. D. MISNER

WRINGER

Original Filed May 20, 1921 2 Sheets-Sheet 1

Inventor
Edgar D. Misner

By M. L. [illegible]
Attorney

June 24, 1924.

E. D. MISNER

Re. 15,865

WRINGER

Original Filed May 20, 1921 2 Sheets-Sheet 2

Inventor
Edgar D. Misner
By W. E. Lind
Attorney

Reissued June 24, 1924. Re. 15,865

UNITED STATES PATENT OFFICE.

EDGAR D. MISNER, OF DETROIT, MICHIGAN, ASSIGNOR, BY MESNE ASSIGNMENTS, TO A. B. McDONALD, OF ERIE, PENNSYLVANIA.

WRINGER.

Original No. 1,453,568, dated May 1, 1923, Serial No. 471,136, filed May 20, 1921. Application for reissue filed February 23, 1924. Serial No. 694,780.

*To all whom it may concern:*

Be it known that I, EDGAR D. MISNER, a citizen of the United States, residing at Detroit, in the county of Wayne and State of Michigan, have invented new and useful Improvements in Wringers, of which the following is a specification.

The invention relates to wringers and refers particularly to the power driven type. The invention has for one of its objects the provision of means which is rotatable in opposite directions to predetermined positions to move one of the rolls of the wringer toward the other and to hold this movable roll under different tension; and also the provision of a cam member having inclined faces terminating in off-set steps for cooperating with the rotatable tensioning member to move the movable roll of the wringer toward the other upon rotation of the tensioning member and to hold the same in either of its adjusted positions. The invention has for another object, the provision of equalizing means for facilitating the simultaneous and equal movements of the opposite ends of the movable roll when moving away from the other roll. Further objects of the invention reside in the novel features of construction as more fully hereinafter set forth.

In the drawings:—

Figure 1:
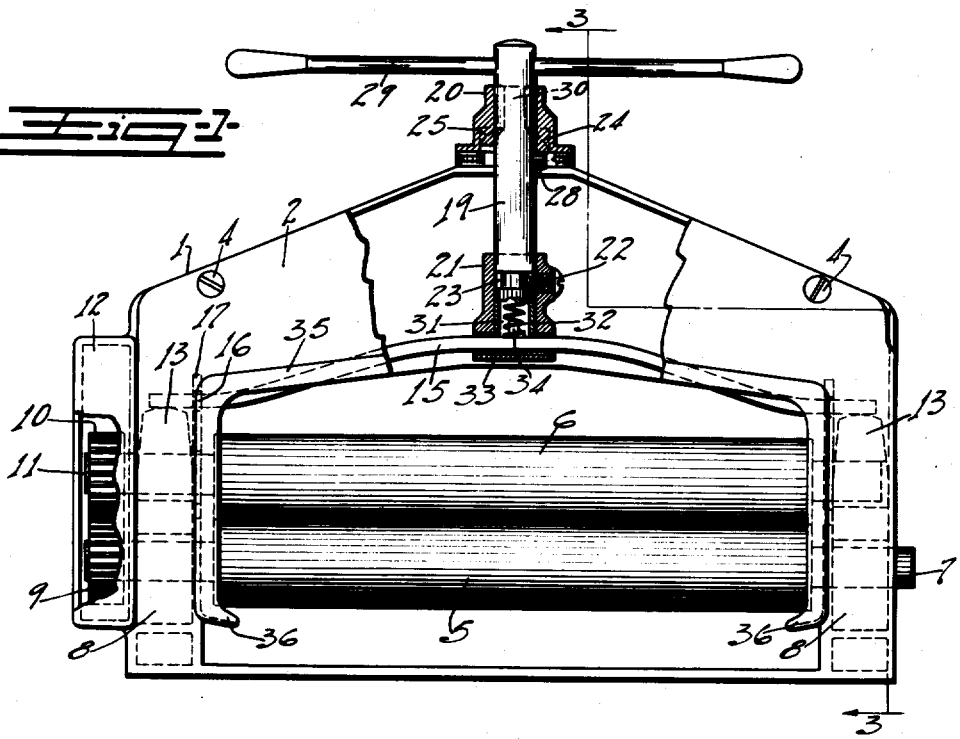
Fig. 1 is a side elevation partly broken away and in section, of a wringer embodying my invention.
Figure 2:
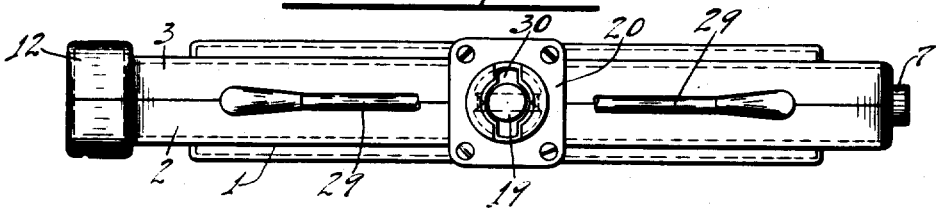
Fig. 2 is a top plan view thereof.
Figure 3:
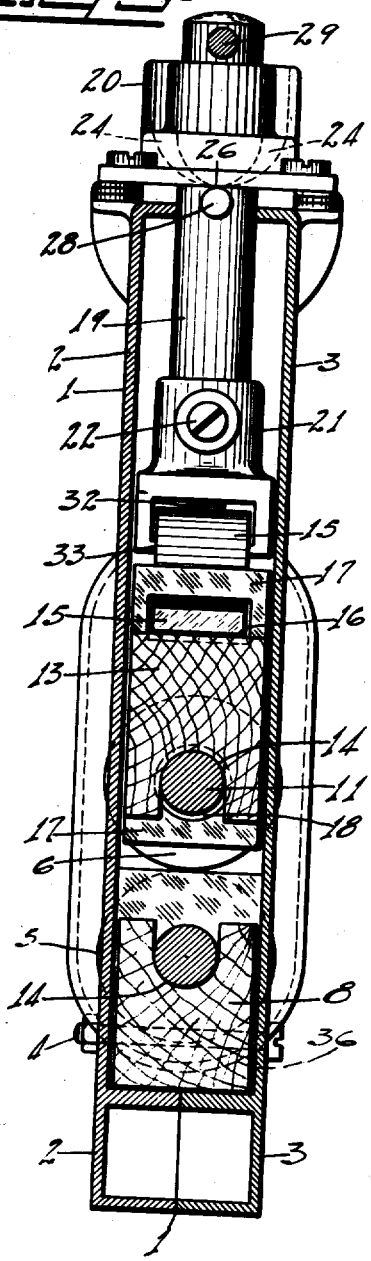
Fig. 3 is a cross section on the line 3—3 of Fig. 1.
Figure 4:
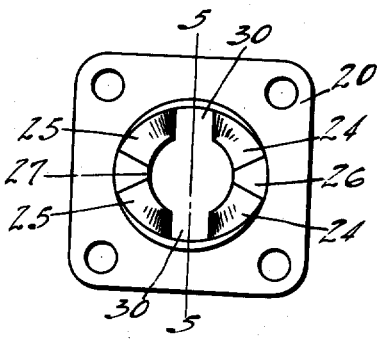
Fig. 4 is a bottom plan view of the stepped cam member.
Figure 5:
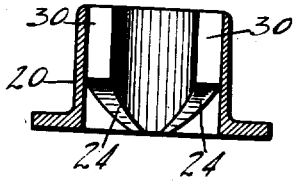
Fig. 5 is a cross section on the line 5—5 of Fig. 2.

1 is the frame of the wringer formed of the complementary sections 2 and 3 which are suitably secured to each other as by means of the machine screws 4. 5 is the power driven roll and 6 the cooperating roll. The shaft 7 of the power driven roll is rotatably mounted in bearing blocks 8 at its opposite ends which are positioned between the complementary sections 2 and 3. 9 is a gear secured to one end of the shaft 7 and adapted to mesh with the gear 10 secured to the corresponding end of the shaft 11 of the cooperating roll, these two gears being inclosed within the enlargement 12 formed upon the complementary sections 2 and 3. 13 are bearing blocks located at the opposite ends of the shaft 11 and slidably engaging between the complementary sections 2 and 3 of the frame.

The bearing blocks 8 and 13 are preferably formed of wood and impregnated with lubricant, each having the half bearing 14 for engagement with the shafts.

15 is a resilient bowed member extending above the cooperating roll 6 and having its ends engaging in rectangular apertures 16 in the upper end of the metal strips 17 which are at the inner sides of the bearing blocks 13 and have circular openings 18 near their lower ends for engagement with the shaft 11, these circular apertures being of sufficient diameter so that when the cooperating roll 6 is moved toward the power driven roll 5 by means of the ends of the resilient bowed member contacting with the tops of the bearing blocks 13, the shaft 11 will contact with the half bearings in the bearing blocks 13. 19 is a tensioning rod extending transversely of the resilient bowed member 15 and longitudinally movable in the cam member 20 secured centrally to the top of the frame 1. This tensioning rod is secured at its lower end to the clip 21 by means of the screw 22 threadedly engaging the clip and extending into the annular groove 23 in the tensioning rod. The lower portion of the clip is U-shaped to embrace the center of the resilient bowed member 15.

For the purpose of facilitating the movement of the cooperating roll 6 toward the power driven roll 5, the cam member 20 has the pairs of cam or inclined faces 24 and 25 at the lower ends of which are the shoulders or steps 26 and 27 respectively, and the tensioning rod 19 has the transverse projection 28, which is preferably a pin, extending out from one side thereof for engagement with these inclined faces and steps, the particular face and step being dependent upon the direction of the rotation of the tensioning rod. The transverse pin 28 is normally between the upper ends of the inclined faces when there is no tension upon the resilient bowed member 15 so that this pin is in position to engage the inclined faces and to ride down over the same upon rotation of the tensioning rod to place the resilient bowed member under tension and to move the cooperating roll 6 toward the power driven roll 5 by means of the bearing blocks 13. The steps 26 and 27 are at different heights so that a different predetermined tension is placed upon the resilient bowed member when the transverse pin is in engagement with each of these steps.

To release the pressure of the cooperating roll upon the power driven roll it is merely necessary to rotate the tensioning rod 19 to disengage its transverse pin 28 from its engaged step, when the pin will ride up over an inclined face. The flat steps 26 and 27 on either side make the releasing movement in either direction similar. The handle 29 is provided at the upper end of the tensioning rod for rotating the same to move the cooperating roll 6 toward the power driven roll or for disengaging the transverse pin from its engaged step; and to prevent rotation of this handle upon releasing the pressure, and after the transverse pin 28 has moved over an inclined face, the upper portion of the cam member 20 has the diametrically opposite slots 30, the walls of which connect into the upper ends of the inclined faces. The handle extending each side of the tensioning rod is conveniently located to permit it to be instantly actuated by the operator in case of accident as for instance the catching of a hand in the rolls and the slight circumferential extent of the steps 26 and 27 make a very short turn necessary to affect a release.

To facilitate the simultaneous and equal movements of the opposite ends of the cooperating roll 6 when moving away from the power driven roll 5, the lower end of the tensioning rod 19 has the recess 31 to receive the coil spring 32. When the tensioning rod is in either of its innermost positions to tension the resilient bowed member 15, the latter rests against the lower end of the tensioning rod; but when the mechanism is tripped, the spring 32 will clamp the resilient bowed member against the base 33 of the U-shaped portion of the clip 21, which base forms an extended bearing for the resilient bowed member and thereby prevents rocking movement of the resilient bowed member relative to the tensioning rod. This resilient bowed member is preferably formed with the lug 34 which is engageable within the lower convolution of the coil spring 32 to longitudinally position the resilient bowed member. The bearing blocks 13 also preferably have their sides slightly tapering to avoid too great a frictional resistance to their movements.

To limit the upward movement of the cooperating roll 6 when the mechanism is tripped, the complementary sections 2 and 3 of the wringer frame are spaced apart a distance less than the diameter of the cooperating roll and have the transversely extending flanges 35 which are adapted to be engaged by the cooperating roll. To drain any water which drops off the ends of the rolls inwardly away from the ends of the wringer frame, there are inwardly extending and downwardly inclined flanges 36 beneath the power driven roll.

What I claim as new is:—

1. In a wringer, the combination with a frame and a pair of rolls mounted thereon, of a rotatable tensioning rod connected to one of said rolls for moving the same toward the other, and a cam member cooperating with said tensioning rod to compel longitudinal movement thereof upon rotation thereof, said cam member having cams merging into steps offset from each other longitudinally of said rod for positioning said tensioning rod.

2. In a wringer, the combination with a frame, of a pair of rolls, a resilient bowed member connected to one of said rolls to move the same toward the other, a cam member having cams merging into a pair of offset steps, a tensioning member connected to said resilient member to tension the same to move said movable roll toward the other, and a transverse projection upon said tensioning member engageable with either of said steps to maintain said resilient member under tension, said tensioning member being rotatable in opposite directions to engage said projection with either of said steps and to disengage said projection from said step.

3. In a wringer, the combination with a frame and a stepped cam member having cams merging into steps, of a pair of rolls, a resilient member connected to one of said rolls to move the same toward the other, a vertical tensioning rod longitudinally slidably engaging said cam member and connected to said resilient member, and a transversely extending pin upon said tensioning rod engageable with the steps of said cam member, said shaft being rotatable in opposite directions to engage said transversely extending pin with either of the steps of said cam member, the steps being off-set longitudinally of said rod from each other.

4. In a wringer, the combination with a frame and a cam member thereon having a slot in its upper portion, inclined faces in its lower portion merging into the walls of said slot and shoulders at the lower ends of said inclined faces, of a pair of rolls, a resilient member connected to one of said rolls to move the same toward the other, a tensioning member slidably engaging said cam member and connected to said resilient member, and a transversely extending pin upon said tensioning member adapted to pass through said slot and engage either of said inclined faces and its shoulder upon rotation of said tensioning member.

5. In a wringer, the combination with a frame, and a cam member thereon having diametrically opposite slots in its upper portion and pairs of inclined faces in its lower portion, each pair terminating at its lower end in steps and said steps being longitudinally offset from each other, of a pair of rolls, a resilient member connected to one of said rolls for moving the same toward the other, a tensioning member slidably engaging said cam member and connected to said resilient member, and a transversely extending pin upon said tensioning member adapted to pass through either of said slots and to engage upon rotation in either direction an inclined face and the step at its lower end.

6. In a wringer, the combination with a frame and a pair of rolls mounted thereon, of a movable means rotatable in opposite directions for moving one of said rolls toward the other, and means for holding said rotatable means in different predetermined positions when said movable roll is moved toward the other.

7. In a wringer, the combination with a frame, of a pair of rolls, a resilient bowed member connected to one of said rolls to move the same toward the other, a tensioning rod connected to said bowed member for tensioning the same to move said movable roll toward the other, a transverse pin upon said tensioning rod, a cam member having an inclined face cooperating with said pin to longitudinally move said tensioning rod, and a step cooperating with said pin to hold said tensioning rod in adjusted position, said rod being rotatable to move said pin over said inclined face to tension said bowed member and to disengage said pin from said step.

8. In a wringer, the combination with a frame and a pair of rolls mounted thereon, of a rotatable tensioning rod for moving one of said rolls toward the other, a transverse pin upon said tensioning rod, means cooperating with said pin for holding said tensioning rod in adjusted position, and a pair of spaced opposingly inclined cams carried by said frame and cooperating with said pin to move said rod longitudinally.

9. In a wringer, the combination with a frame and a pair of rolls mounted thereon, of a rotatable tensioning rod for moving one of said rolls toward the other, a transverse pin upon said tensioning rod, means cooperating with said pin for holding said tensioning rod in adjusted position, and a cam member having open slots therethrough and provided with cammed surfaces in said slots for engaging said transverse pin upon rotation of said tensioning rod in either direction for moving said tensioning rod longitudinally toward the rolls.

10. In a wringer, the combination with a frame, of a pair of rolls, a resilient member connected to one of said rolls for moving the same toward or away from the other of said rolls, a longitudinally movable member slidably engaging the top of said frame, a clip between said longitudinally movable member and said resilient member, and yieldable means for clamping said resilient member against said clip.

11. In a wringer, the combination with a pair of rolls, of a member connected to one of said rolls and adapted to move the same toward the other, a tensioning rod loosely connected to said member and adjustable to move the same and the roll connected thereto toward the other roll, said rod being adapted to be held in an adjusted position, and yieldable means for holding said member in a predetermined position with respect to said rod when said rod is released.

12. In a wringer, the combination with a pair of rolls, of a member, members between the ends of one of said rolls and said member for moving said roll by said member, a tensioning rod connected to said member and adjustable to move the roll actuated thereby toward the other roll, said rod being adapted to be held in an adjusted position and permitting of rocking movement of said member relative thereto, and yieldable means between said rod and member for holding said member in a predetermined position relative to said rod when said rod is released.

13. In a wringer, the combination with a frame and a pair of rolls mounted thereon, of a rotatable and longitudinally movable member for moving one of said rolls toward the other, and means cooperating with said member upon rotation thereof for longitudinally moving said member and a device holding the same in a predetermined adjusted position, said member being rotatable in either direction to release the same.

14. In a wringer, the combination with a frame and a pair of rolls mounted thereon, of a rotatable and longitudinally movable member for moving one of said rolls toward the other, and a member cooperating with said first-mentioned member upon rotation thereof for longitudinally moving said first-mentioned member and holding the same in a predetermined position, one of said members having a step and inclined faces leading to said step, and the other of said members having a projection engageable with said step and faces, said first-mentioned member being rotatable in either direction to disengage said step and projection.

15. In a wringer, the combination with a frame and a pair of rolls mounted thereon, of a tensioning rod adjustable longitudinally in one direction for moving one of said rolls toward the other, a projection on said tensioning rod, and means for holding said tensioning rod in an adjusted position comprising a member provided with a step and inclined faces converging toward said step, said step and faces being engageable with said projection, and said tensioning rod being rotatable in either direction to disengage said projection, from said step.

16. In a wringer, the combination of a wringer frame; rolls mounted in the frame; a spring exerting pressure on the rolls; and means locking the spring in tension comprising members, one of which is rotatable and slidable on an axis in the direction of pressure exerted by the spring, said members having circumferentially extending interlocking shoulders similarly releasable by rotative movement of the rotatable member in either direction whereby the release of the spring may be accomplished by a slight rotation of the movable member in either direction.

17. In a wringer, the combination of a wringer frame; rolls mounted in the frame; a spring exerting pressure on the rolls; means locking the spring in tension comprising members, one of which is rotatable on an axis in the direction of pressure exerted by the spring, said members having circumferentially extending interlocking shoulders similarly releasable by rotative movement of the rotatable member in either direction whereby the release of the spring may be accomplished by a slight rotation of the movable member in either direction; and handles extending both sides of the movable member above and lengthwise of the frame.

18. In a wringer, the combination of a wringer frame; rolls mounted in the frame; a spring exerting pressure on the rolls; means locking the spring in tension, comprising members, one of which is rotatable and slidable on an axis in the direction of pressure exerted by the spring, said members having circumferentially extending interlocking shoulders similarly releasable by rotative movement of the rotatable member in either direction, whereby the release of the spring may be accomplished by a slight rotation of the rotatable member in either direction; and handles extending both sides of the movable member, lengthwise of the frame.

19. In a wringer, the combination of a wringer frame; rolls mounted in the frame; a spring exerting pressure on the rolls; and means locking the spring in tension comprising a locking member having a slot therein with a shoulder at the lower end of the locking member, a tension member slidably engaging said locking member having a shoulder adapted to pass through said slot and to be brought under the shoulder at the lower end of the locking member by rotative movement and being similarly releasable from the locking member by a rotative movement in either direction.

20. In a wringer, the combination of a frame and a pair of rolls; of a pressure and quick release device for said rolls, comprising relatively longitudinally and rotatively movable members; and means cooperating with said members comprising three successively operative elements, a longitudinally guiding and rotatively locking element, controlling the initial relative movement of the members, a camming element operative through the relative rotation of the members to move the members longitudinally relatively to each other and a locking element leading from the camming element made operative by continued relatively rotative movement of the members locking them against a longitudinal release movement.

21. In a wringer, the combination with a frame and a pair of rolls; of a pressure and quick release device for said rolls, comprising relatively longitudinally and rotatively movable members; and means cooperating with said members comprising successive operating elements, a longitudinally guiding and rotatively locking element controlling the initial relative movement of said members; camming elements operative through relative rotation of the members in either direction to move the members longitudinally relatively to each other; and locking elements leading from the camming elements made operative by a continued relatively rotative movement of the members locking them against a longitudinal release movement.

22. In a wringer, the combination of a frame and a pair of rolls; of a pressure and quick release device for said rolls, comprising relatively longitudinally and rotatively movable members; and means cooperating with said members comprising three successively operative elements, a longitudinally guiding and rotatively locking element, controlling the initial relative movement of the members, a camming element operative through the relative rotation of the members to move the members longitudinally relatively to each other and a locking element leading from the camming element made operative by continued relatively rotative movement of the members locking them against a longitudinal release movement, said locking element being releasable by relative rotative movement of the members in either direction.

23. In a wringer, the combination with a frame and a pair of rolls; of a pressure and quick release device for said rolls, comprising relatively longitudinally and rotatively movable members; and means cooperating with said members comprising successive operating elements, a longitudinally guiding and rotatively locking element controlling the initial relative movement of said members; camming elements operative through relative rotation of the members in either direction to move the members longitudinally relatively to each other; and locking elements leading from the camming elements made operative by a continued relatively rotative movement of the members locking them against a longitudinal release movement, said locking elements being releasable by relative rotative movement of the members in either direction.

24. In a wringer, the combination of a frame and a pair of rolls mounted thereon; of a rotatable and longitudinally movable member for moving one of said rolls toward the other; and means cooperating with said member upon rotation thereof in either direction for longitudinally moving said member and holding the same in a predetermined position.

25. In a wringer, the combination of a frame and a pair of rolls mounted thereon; of a rotatable and longitudinally movable member for moving one of said rolls toward the other; and means cooperating with said member upon rotation thereof in either direction for longitudinally moving said member and holding the same in a predetermined position, said member being rotatable in either direction to release the same.

26. In a wringer, the combination with a frame and a pair of rolls mounted thereon; of means adjusting and releasing pressure on said rolls, comprising two cooperating members having initial relative longitudinal movement; said members controlling said initial movement being locked against rotation and capable of relative rotative movement after said initial movement; one of said members having a radial projection and the other a vertical slot leading to a cam, said cam terminating in a step; the slot, cam and step controlling the relative movement of the members to an initial longitudinal non-rotative movement, followed by a rotative and longitudinal movement during the camming action, and a rotative movement to bring the projection in position on the step.

27. In a wringer, the combination with a frame and a cam member thereon having a slot in its upper portion, inclined faces in its lower portion merging into the walls of said slot and shoulders at the lower ends of said inclined faces, of a pair of rolls, a resilient member connected to one of said rolls to move the same toward the other, a tensioning member slidably engaging said cam member and connected to said resilient member, and a transversely extending pin upon said tensioning member adapted to pass through said slot and engage either of said inclined faces and its shoulder upon rotation of said tensioning member, said pin being releasable from the shoulder upon rotation of said tensioning member in either direction.

In testimony whereof I have hereunto set my hand.

EDGAR D. MISNER.